Oct. 18, 1960 J. A. HANSEN 2,956,454
INDEX MECHANISM FOR A COMBINATION MACHINE TOOL
Filed March 10, 1958 7 Sheets-Sheet 1
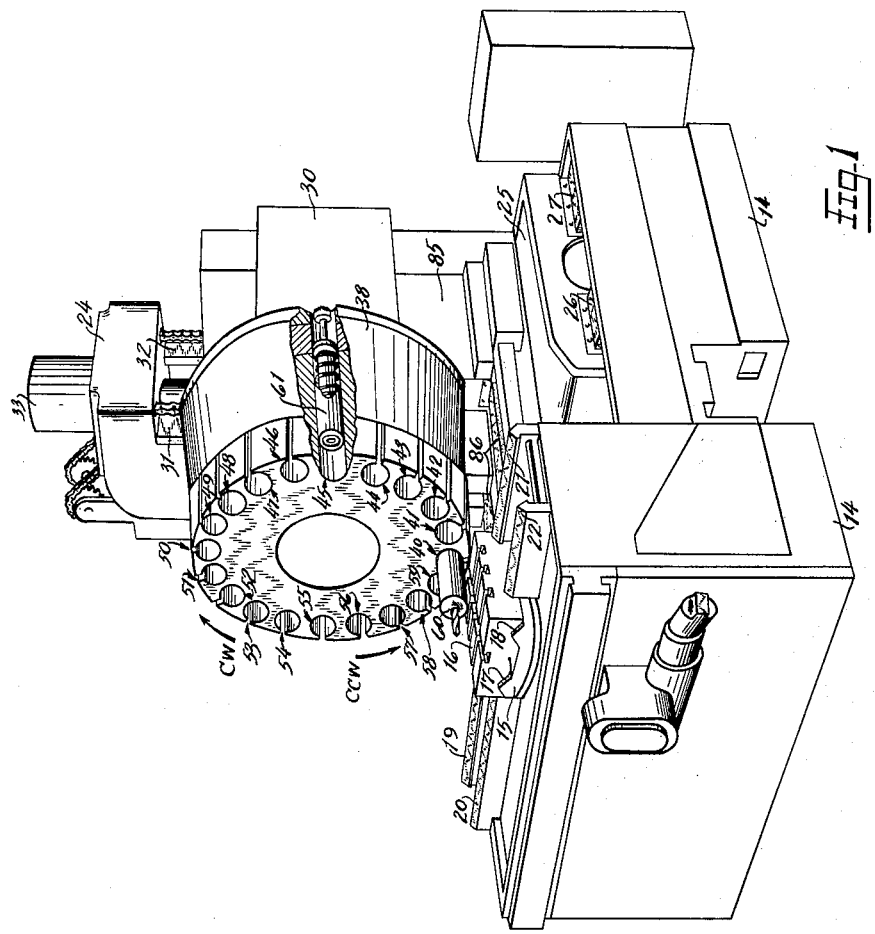
INVENTOR.
John A. Hansen
BY
Attorney

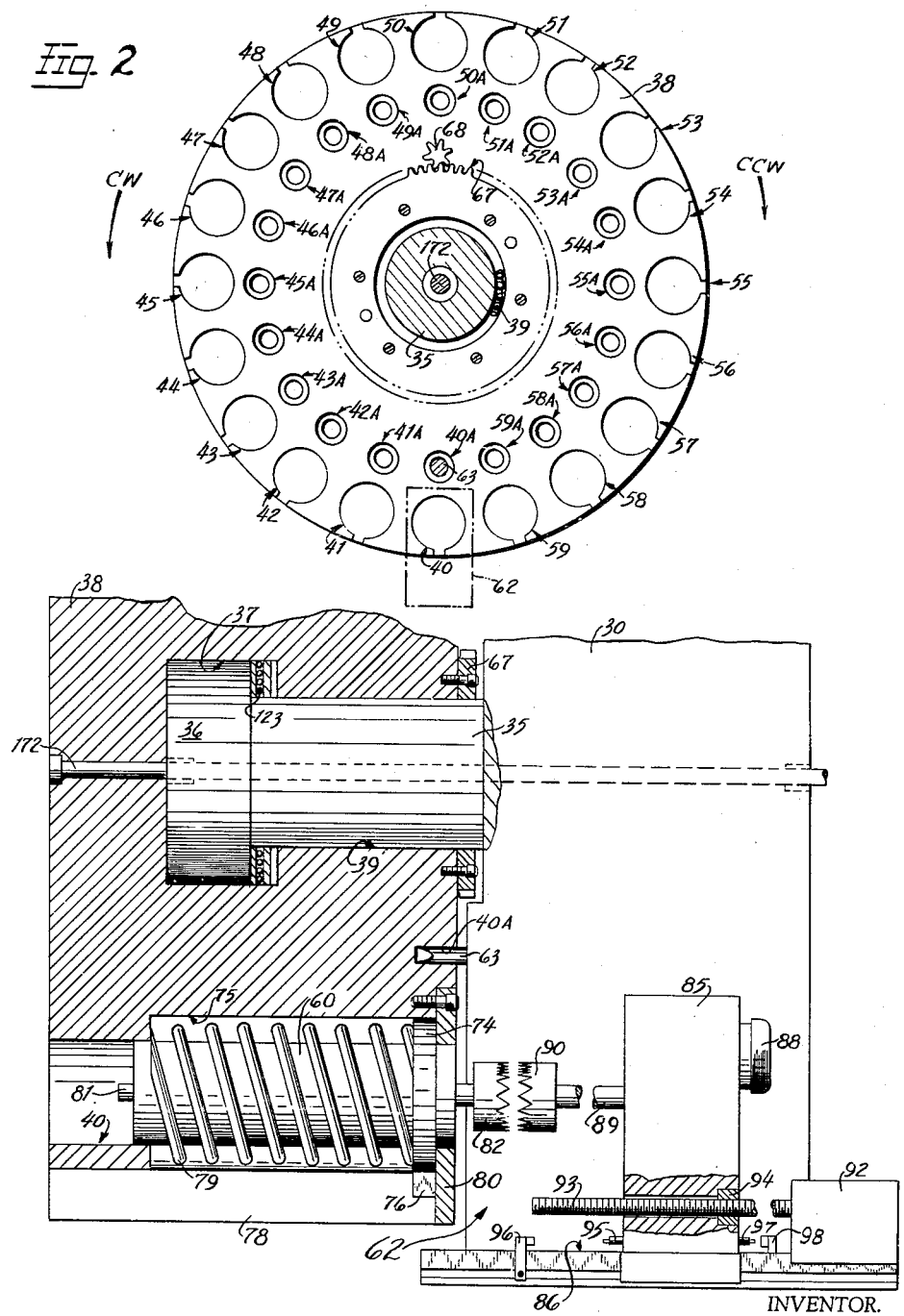

Oct. 18, 1960  J. A. HANSEN  2,956,454
INDEX MECHANISM FOR A COMBINATION MACHINE TOOL
Filed March 10, 1958  7 Sheets-Sheet 3
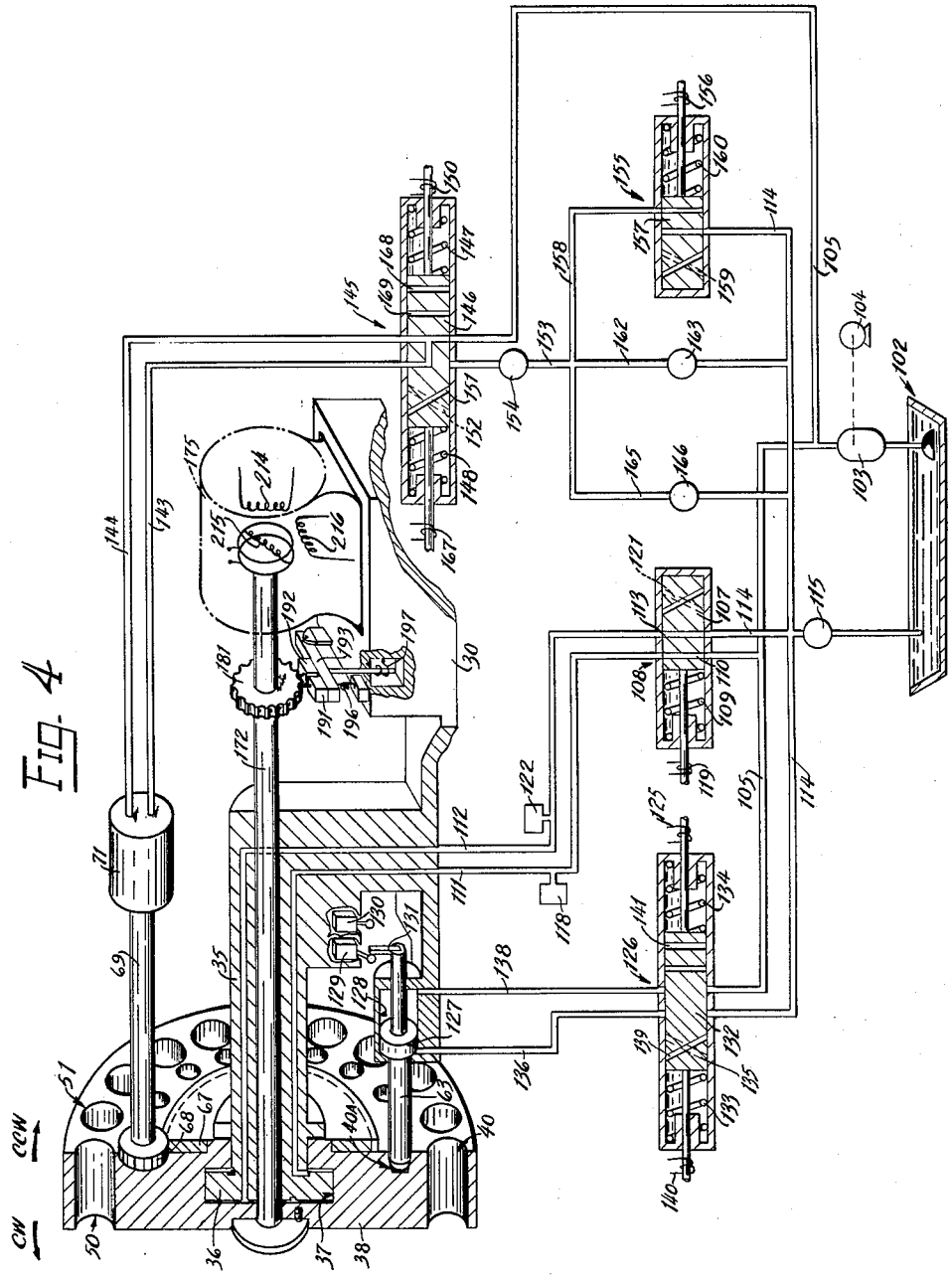
INVENTOR.
John A. Hansen
BY
Attorney Oct. 18, 1960    J. A. HANSEN    2,956,454
INDEX MECHANISM FOR A COMBINATION MACHINE TOOL
Filed March 10, 1958    7 Sheets-Sheet 4
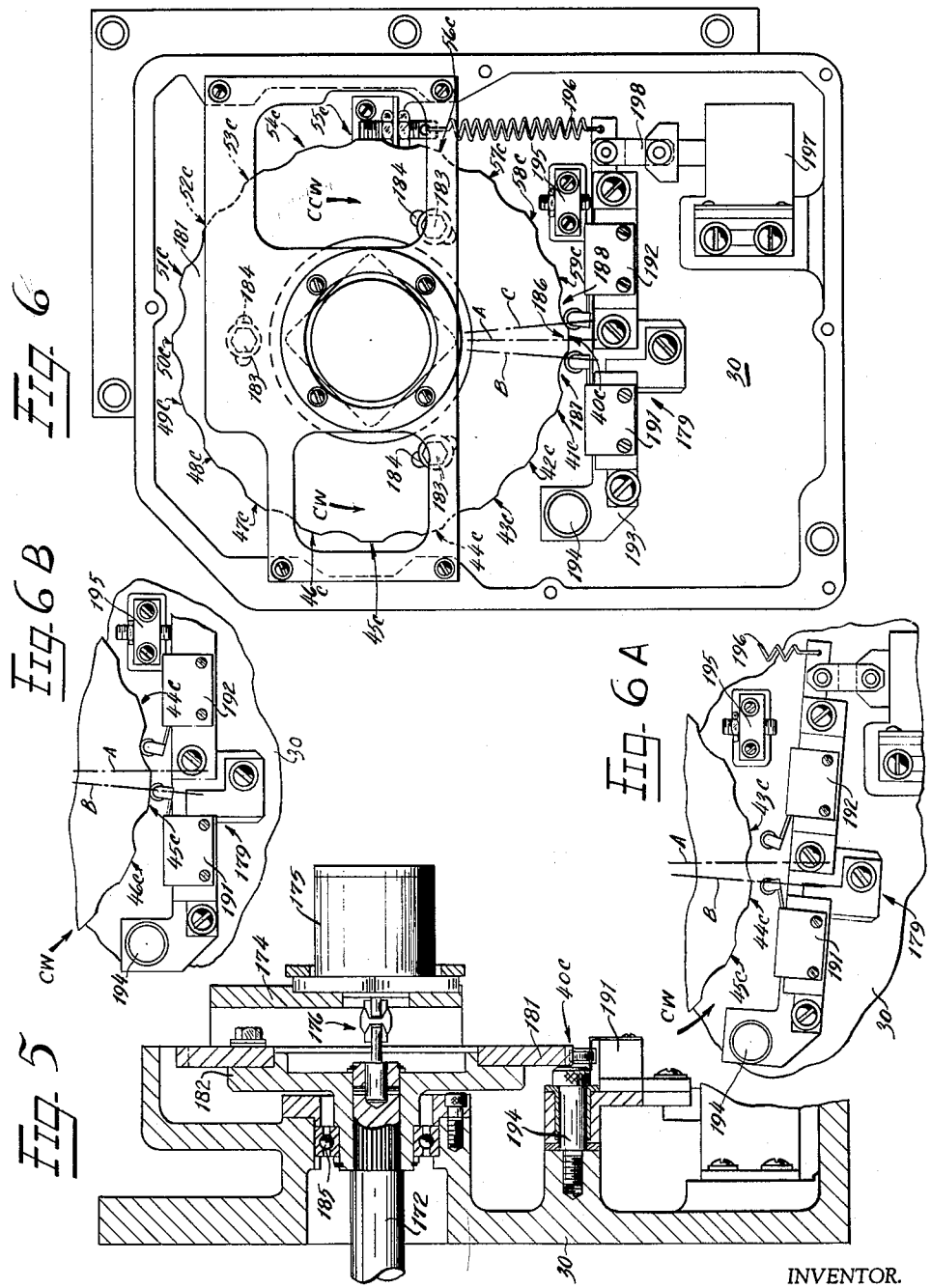
INVENTOR.
John A. Hansen
BY
Attorney INVENTOR.
John A. Hansen

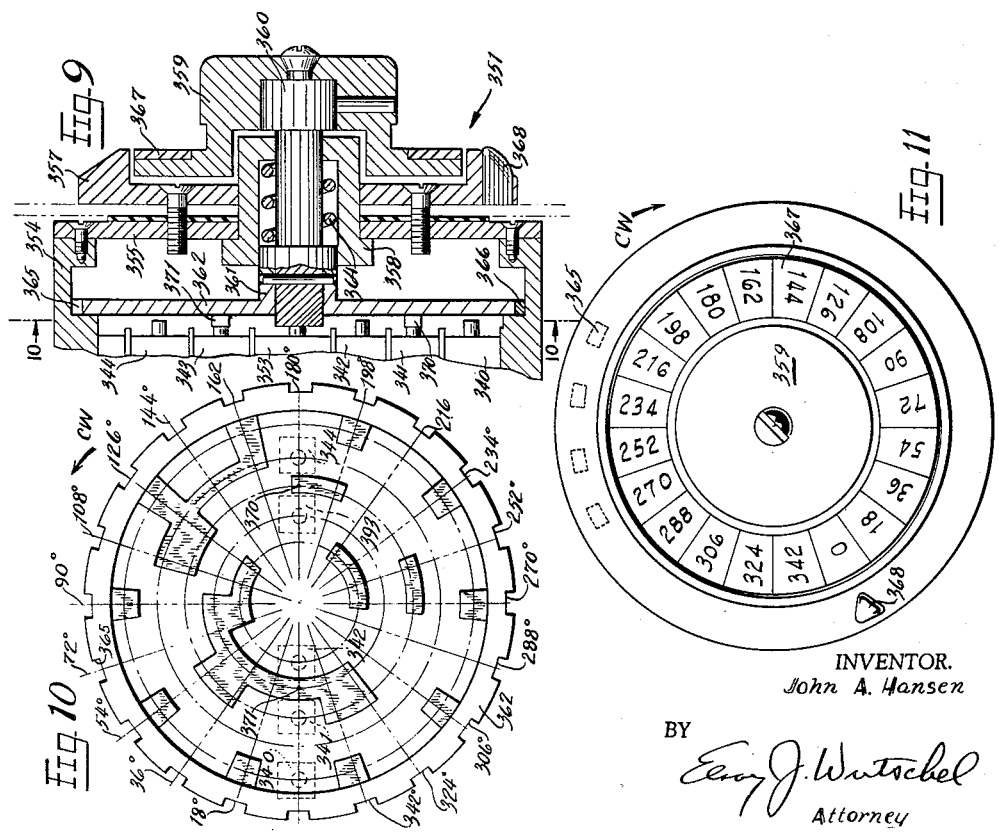

United States Patent Office 2,956,454
Patented Oct. 18, 1960

2,956,454

INDEX MECHANISM FOR A COMBINATION MACHINE TOOL

John A. Hansen, Greendale, Wis., assignor to Kearney & Trecker Corporation, West Allis, Wis., a corporation of Wisconsin Filed Mar. 10, 1958, Ser. No. 720,361

10 Claims. (Cl. 77—25)

This invention relates generally to an index mechanism for a machine tool, and more particularly to an improved indexable control mechanism for the spindle carrying drum of a machine tool.

The principal object of the invention is to provide an improved index mechanism for a machine tool.

Another object of the invention is to provide an index mechanism capable of advancing an indexable member to a selected one of a plurality of index stations.

Another object of the invention is to provide an improved index control mechanism operatively connectable to advance an indexable machine tool support member to be selected index station by the shortest index route.

Another object of the invention is to provide an indexable control mechanism that is particularly adapted for either manual index selection, or automatic index selection in response to a program control system.

Another object of the invention is to provide an improved index control system in combination with an indexable member movable to a plurality of different index stations, in any predetermined sequence.

A further object of the invention is to provide an improved index control system in combination with an indexable member movable to a plurality of different index stations, that is responsive to a remotely positioned electrical control station and that obviates the necessity for any predeterminately positioned stop dogs.

A further object of the invention is to provide an improved index control mechanism operative to advance an associated rotatably indexable member to any one of a plurality of different index stations, with the index movement taking place by way of the shortest route in accordance with the location of the previous index station.

A still further object of the invention is to provide an improved index control system incorporating means for accurately measuring the distance to be indexed between any existing index station and the next selected index station.

A still further object of the invention is to provide an improved electro-hydraulic index control mechanism that is responsive to a remotely located operating station for effecting selective indexable movement of an associated rotatable index member at an initial rapid rate; reducing the rapid indexing rate to a creep rate a predetermined distance from the selected station; electrically stopping indexing movement; and effecting final positioning by means of an automatically retractable index plunger.

Another object of the invention is to provide an index control mechanism capable of advancing an associated rotatably journalled index member to one of a plurality of index stations, in combination with a pair of retractable cam actuated creep-stop switches that are automatically moved into cam engaging position upon approach of the indexable member to its selected index station.

According to this invention, a machine tool having a frame and a movable work support is provided with an indexable tool supporting drum that is carried for bodily movement in mutually perpendicular planes relative to the work support. The tool supporting drum is provided with a plurality of peripherally spaced bored openings, parallel to the drum axis, and respectively disposed to slidably support a plurality of axially movable spindle carrying quills that are normally retained in a retracted storage position. By means of this arrangement, the drum is indexably rotatable to position a selected spindle carrying quill adjacent a single working station provided with a bodily movable, power driven feed driving unit. Whenever a particular quill is indexed into the working station, a retractable locking and final positioning index plunger is operable to retain the rotatable drum in selected position. The power driven feed unit is then movable to advance the operatively positioned quill and its associated spindle, simultaneously supplying power for effecting both axial feeding movement and tool spindle rotation. At the completion of a particular drilling or boring operation, the feed unit is retracted to permit return movement of the quill and associated spindle to its normal storage position within the indexable quill supporting drum. Likewise, at the completion of a selected drilling operation, the spindle drum is connectable to be indexed in either direction to position another, different quill and associated spindle adjacent the single working station. By means of this arrangement, the quill carrying drum is selectively indexable to position the respective spindle supporting quills adjacent the working station in any selected sequence, to perform corresponding machining operations. For indexably rotating the spindle carrying drum, there is provided an integrated electro-hydraulic control system operative to effect rapid indexing movement by the shortest route at a rapid rate; automatically reducing the rapid rate to a creep rate a predetermined distance from the selected station; stopping drum rotation; and, re-engaging the index plunger to effect final precise positioning of the drum. This arrangement obviates the necessity for adjustable stops or dogs and reduces considerably the elapsed time required to advance from one index station to any next selected index station. To determine the extent of indexable movement, the integrated electro-hydraulic control system is operative to provide a voltage phase signal corresponding to the existing angular position of the drum, and comparing it with an angular reference voltage phase corresponding to the next selected indexed position. Indexing movement of the drum is then initiated at rapid rate until the drum is a predetermined distance from the selected position, at which time a fine positioning servo effects the final approximate positioning and the drum is stopped by co-action of a synchronously rotatable multi-lobe cam and a pair of coincidently operable creep-stop switches. The creep-stop switches are carried for automatic bodily retraction during rapid indexing movement, and are moved into operative engagement with the periphery of the multi-lobe cam to control the creep and stop portion of the index cycle. Final precise positioning is effected by inward movement of a tapered index plunger into engagement with one of a plurality of index notches in the drum, the notches corresponding in number to the spindle quills carried thereby.

The foregoing and other objects of the invention which will become more fully apparent from the following detailed description of mechanisms exemplifying preferred embodiments of the invention, may be achieved by the apparatus and control system described herein in connection with the accompanying drawings, in which:

Figure 1 is a view in perspectvie of a machine tool incorporating the present invention, with certain parts being broken away to show a spindle carrying quill carried by the indexable drum;

Fig. 2 is a view in transverse vertical section of the rotatable support for the indexable drum, and showing the rearward face of the drum as well as the drive mechanism therefor;

Fig. 3 is an enlarged diagrammatic view illustrating the operative relationship between the bodily movable feed slide and a quill indexably positioned by the drum in the single work feeding station;

Fig. 4 is an enlarged diagrammatic view, partly in perspective and partly in longitudinal vertical section through the drum and drum support including the hydraulic control system for effecting indexable drum movement;

Fig. 5 is an enlarged detailed view through the cam actuating control mechanism, and showing the driving connection for the position indicating selsyn;

Fig. 6 is an enlarged detailed view in rear elevation of the control cam, and associated retractable switching mechanism for effecting final electrical positioning of the quill carrying drum;

Fig. 6A is an enlarged fragmentary view in rear elevation showing the creep-stop switch mechanism in retracted position relative to the cam;

Fig. 6B is an enlarged fragmentary view in rear elevation showing the co-action between the periphery of the cam and the creep-stop switches after directional control is transferred to these switches;

Fig. 9 is an enlarged fragmentary view in vertical section through the manual index selection mechanism, showing the rotatable cam and associated selector switches;

Fig. 10 is an elevational view of the cam plate taken generally along the lines 10—10 in Fig. 9;

Fig. 11 is a view in elevation of the quill selection dial;

Fig. 12 is a chart illustrating the binary code scheme of switch control for activating the electro-hydraulic system to effect a selected index movement; and, Fig. 13 is a schematic electrical control circuit for the feed driving unit.

Figure 7:
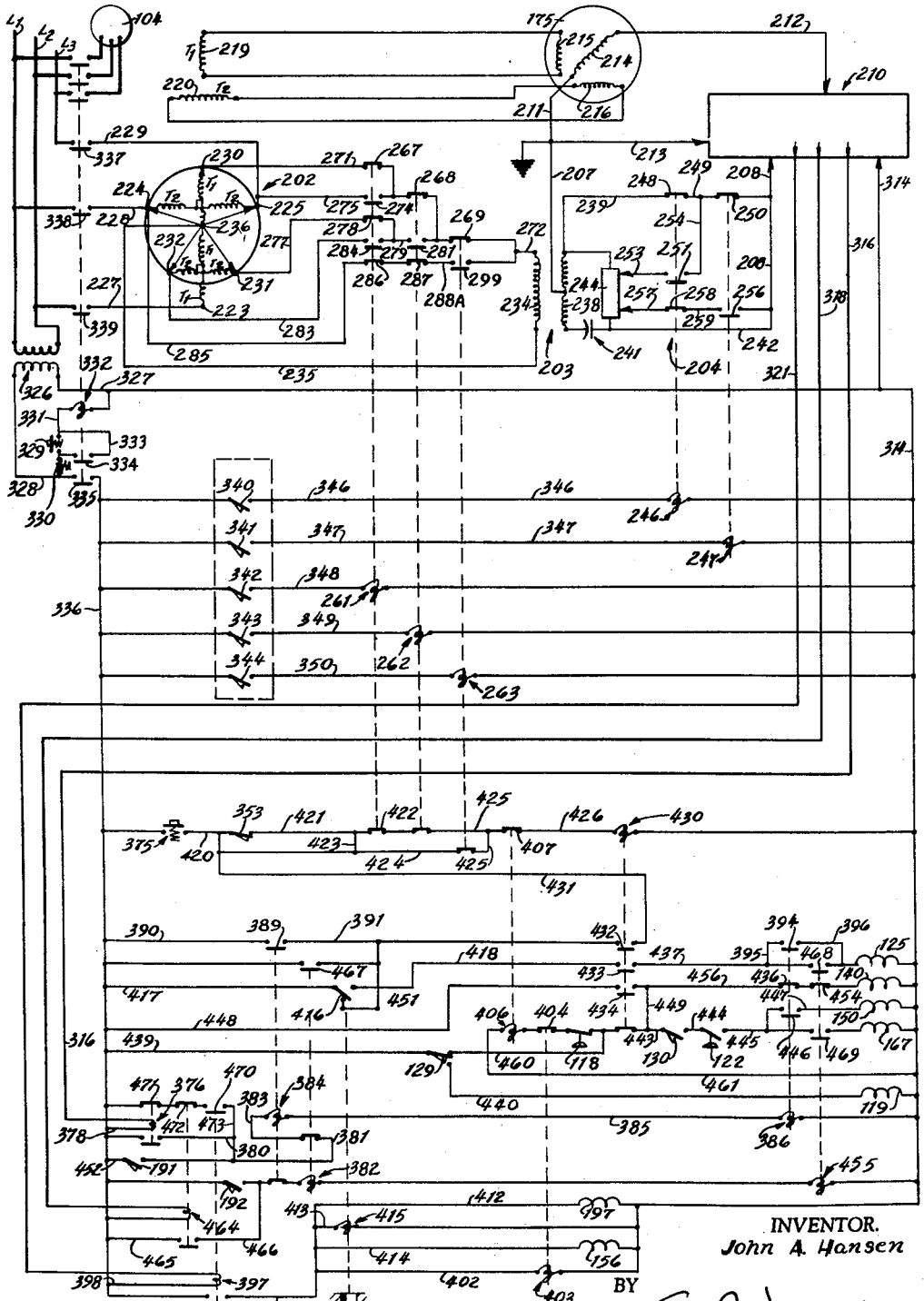
Fig. 7 is a schematic electrical control circuit for effecting automatic indexing control of the quill carrying drum.

Referring to Fig. 1 of the drawings, there is shown a combination machine tool comprising a preferred embodiment of the invention and provided with a principal supporting frame or base 14, having on its central forward portion a rotatable index table 15 carrying a removable work pallet 16. The rotatable index table 15 is provided on its upper surface with a pair of spaced apart ways 17, 18 disposed to cooperate with complementary way surfaces formed on the underside of a work carrying pallet, such as the pallet 16. It will be apparent that rotation of the table 15 may be effected to align the table ways 17, 18 with cooperating way surfaces 19, 20 and 21, 22 carried by the supporting bed 14. In this manner, a workpiece supported by the pallet 16 may be moved into the proper operating position upon the indexable rotary table 15.

A vertically upstanding column structure 24 provided with a laterally extending base section 25 is slidably mounted upon longitudinally extending way surfaces 26, 27 formed toward the rearward portion of the supporting bed 14. A selectively power driven screw and nut translating mechanism (not shown) is connectable to effect longitudinal movement of the integrally formed base 25 and column 24 relative to the supporting bed 14 and work pallet 16. The column 24 is likewise disposed to support a vertically movable saddle 30 provided with way surfaces (not shown) that operatively engage spaced apart, vertically extending column way surfaces 31 and 32.

To effect bodily vertical movement of the saddle 30, along the column upright 24, a screw and nut translating mechanism (not shown) operatively inter-connected therebetween in well known manner is adapted to be driven by a motor 33.

As diagrammatically shown in Figs. 2, 3 and 4, the saddle 30 is integrally formed with a forwardly extending, vertically disposed, circular, stationary support member 35. The circular support member 35 is, in turn, provided with an enlarged circular portion 36 constituting a stationary piston that is operatively encompassed by a cooperating hydraulic cylinder 37 formed within an indexably rotatable quill carrying drum 38. As shown in the drawings, the drum 38 is a rotatable member provided with a circular bearing 39 disposed to rotatably engage the forwardly extending circular, stationary support member 35. As will hereinafter be more fully explained, the cooperating piston 36 and cylinder 37 constitute means for shifting the rotatable member or drum 38 axially forward to facilitate indexing, and shifting the drum 38 in the opposite direction to clamp or brake the drum against rotation.

The rotatable index drum 38 is provided with 20 circumferentially spaced bored openings 40 to 59 inclusive, respectively disposed to support spindle carrying quills for axial movement, such as the quills 60 and 61 shown in Fig. 1.

With the drum positioned as shown in Figs. 1, 3 and 4, the bored drum opening 40 and the spindle quill 60 carried thereby are properly positioned relative to a single, work feeding operating station 62. To retain the drum in a selected position, relative to the operating station, a retractable index plunger 63, Fig. 4, is disposed to engage one or another of a plurality of index notches 40A to 59A inclusive. The extreme forward portion of the index plunger 63 is tapered slightly to cooperate with the beveled indexed notches. Thus, after the drum has been indexed to an approximate final selected position in response to the electrical control system, inward movement of the tapered index plunger 63 effects final precise positioning of the drum, and fixedly retains it in selected position.

For rotating the drum to effect indexing movement, a ring gear 67 secured to the rear face thereof is engaged by a pinion 68. The pinion 68 is secured to a shaft 69 driven by a fluid actuated hydraulic motor 71, Fig. 4. The single fluid actuated motor 71 is reversibly actuatable to effect initial rapid movement during coarse positioning; to effect a reduction from rapid to creep rate as the selected position is approached, and to provide a dynamic braking effect as the final, approximate position is reached.

Inasmuch as the construction and mode of operation of the 20 spindle carrying quills is identical, only the quill 60 will be described in detail in connection with Fig. 3. As there shown in simplified diagrammatic form, the forward end of the quill 60 is guidably supported by the cooperating bored opening 40 formed in the index drum 38. An enlarged circular collar 74 fixedly secured to the rearward portion of the quill 60 is slidably constrained for axial movement within an enlarged circular bored opening 75 in the drum 38 that is concentric with the circular bore 40. To restrain the quill against rotation, the collar member 74 is provided with a lateral tongue 76 that engages a slot 78. A spring 79 seated at its forward end within the enlarged circular opening 75 engages the collar member 74 to normally urge the quill 60 in a rearward direction, against an abutment plate 80 secured to the rearward face of the drum 38. A rotatably journalled tool spindle 81 carried by the quill 60 has secured to its rearwardly extending end a driven clutch element 82.

Whenever the drum is retained in the position shown in Fig. 3, the spindle quill 60 is positioned adjacent the single work operating station 62 in which a bodily movable feed drive unit 85 is connectable to effect both rotatable and axial movement of the tool spindle 81. The drive unit 85 is guidably constrained by way surfaces 86 presented by the saddle 30 for bodily movement in a plane parallel to the axis of spindle rotation. A drive motor 88 secured to the feed unit 85 is connected to drive an output shaft 89 carrying a driving clutch element 90 disposed to cooperate with the driven clutch element 82. Another motor 92 secured to the saddle 30 is energizable to drive a feed screw 93 that engages a stationary nut 94 carried by the unit 85. It will be readily apparent that upon energization of motors 88 and 92, the feed drive unit 85 is moved in a leftward direction in a manner that the clutch element 90 operatively engages the clutch element 82 for rotating the tool spindle 81. Movement of the feed unit 85 continues in a leftward direction to effect axial and rotatable movement of the tool spindle 81, until a reverse switch 95 carried by the feed unit 85 engages an adjustable dog 96 secured to the saddle 30. Thereupon, movement of the feed unit 85 is reversed to permit resiliently biased retracting movement of the quill 60 until the feed unit 85 returns to its inactive parked position shown in Fig. 3, and with movement stopping as a switch 97 is engaged by a dog 98.

Although the feed drive mechanism shown in Fig. 3 illustrates the principle of selectively driving one or another of a plurality of indexably positioned tool spindles, an improved feed drive mechanism for accomplishing this result is fully shown and described in copending U.S. Patent No. 2,952,170, dated September 13, 1960.

For indexably moving the drum 38 and retaining it in indexed position, there is provided an electrically activated hydraulic control system as schematically represented in Fig. 4. From a sump or reservoir 102 contained within the saddle, hydraulic fluid is withdrawn by a pressure pump 103 driven by a motor 104. From the pump 103, fluid under pressure is transmitted to a main pressure supply line 105. Whenever the drum 38 is in a selected operating position, it is urged rearwardly into positve abutting engagement with the front face of the stationary piston 36. With this condition existing, as shown in Fig. 4, a movable valve spool 107 of a brake control valve 108 is urged rightwardly by means of a spring 109. Thus, fluid under pressure is transmitted from the main supply line 105 via a valve spool groove 110 to a line 111. The hydraulic line 111 communicates with the rearward portion of the hydraulic cylinder 37 in a manner that pressure fluid urges the entire drum 38 to move a slight distance axially in a rearward direction. At the same time, fluid is exhausted from the forward end of the cylinder 37 via a line 112 connected by means of a valve spool groove 113 to an exhaust line 114, connected via a check valve 115 to the sump 102. With the drum positively urged to a right rearward position, a pressure actuated electrical switch 118 is retained in closed position to indicate that the drum is in braking engagement with the front face of the piston 36.

To release the brake, the drum is urged forwardly from its normal brake position. To accomplish this, a solenoid 119 associated with the valve 108 is energized to effect leftward movement of the valve spool 107, and connecting the main pressure supply line 105 via a cannelure 121 to the line 112 communicating with the forward end of the cylinder 37. With the drum 38 moved forward relative to the stationary piston 36, a pressure actuated electric switch 122 is urged into closed position. With this condition existing, as schematically shown in Fig. 3, a thrust bearing 123 facilitates drum rotation.

As a prerequisite to effecting indexing movement, it is necessary to actuate both the solenoid 119 and a solenoid 125 of a three position valve 126 that is operative to control axial retracting movement of the index plunger 63. As shown in Fig. 4, the index plunger 63 has affixed to its central rearward portion a piston 127 constrained to move within a cooperating stationary hydraulic cylinder 128 carried by the saddle 30. Whenever the index plunger 63 is in its forward engaged position, as shown in Fig. 4, a cam member 131 carried for movement with plunger 63 is operative to actuate a position indicating switch 129. In a similar manner, rearward movement of the index plunger 63 to its fully retracted position effects actuation of a switch 130.

To preclude retraction of the plunger 63 when the drum 38 is positioned in a selected station, a valve spool 132 of the three position valve 126 is normally retained in a central neutral position by means of springs 133 and 134. With this condition existing, the valve spool 132 is so positioned as to completely interrupt the flow of pressure fluid from the main supply line 105. Upon energization of solenoid 125, the valve spool 132 is moved rightwardly to complete a hydraulic circuit from the supply line 105 via a groove 139 to a line 136 communicating with the forward end of the cylinder 128. As the piston 127 is urged rearwardly to retract plunger 63, fluid is exhausted from the cylinder 128 via a line 138, and a valve spool groove 135 to the main exhaust line 114. To re-engage the index plunger 63 with one or another of the notches presented by the drum 38, a solenoid 140 associated with the position valve 126 is energized, thereby effecting leftward movement of the valve spool 132 and connecting the pressure supply line 105 via a cannelure 141 to the line 138.

Immediately prior to engagement of the index plunger 63 and rearward movement of the drum to a brake or clamp position, fluid under pressure is simultaneously transmitted to a pair of hydraulic lines 143 and 144 connected to supply hydraulic fluid to the fluid actuated driving motor 71. Thus, as the drum approaches a selected position, simultaneous admission of pressure fluid to both of the lines 143 and 144 stops rotation of the motor 71 to stop movement of the drum 38, immediately prior to engagement of the index plunger 63 and rearward clamping movement of the drum 38 relative to the piston 36.

For controlling rotational movement and stopping of the fluid actuated motor 71, there is provided a three position motor control valve 145. With a valve spool 146 of the valve 145 resiliently biased to a neutral position by springs 147 and 148, fluid from the main supply line 105 is transmitted directly to both of the lines 143 and 144.

To activate the motor 71 for effecting clockwise or forward drum rotation, a solenoid 150 is energized to effect rightward movement of the valve spool 146. Rightward movement of the valve spool 146, in turn, operates to connect the pressure supply line 105 via a cannelure 151 to the motor supply line 143. At the same time, the return flow of pressure fluid from the motor 71 continues to the line 144 via a valve spool groove 152 to a motor speed regulating line 153. The rate at which pressure fluid is exhausted from the return line 153 is determined by a predeterminately adjusted throttle control valve 154 and a selectively actuatable rate change valve 155, the latter being operative to control the motor for rotation either at a creep or rapid traverse rate.

At the start of clockwise drum indexing movement, a solenoid 156 associated with the speed control valve 155 is energized simultaneously with the solenoid 150 associated with the directional control valve 145. Thus, initial fast movement of the motor 71 is effected since the rate control line 153 is connected via a line 158, and valve spool groove 159 to the main exhaust line 114. The reduction of motor speed to a creep rate is effected upon de-energization of solenoid 156, the valve spool 157 then being urged leftwardly by a spring 160. As this occurs, the flow of fluid from line 158 is interrupted, and the return flow of fluid from the motor 71 continues from line 153 to a line 162. The line 162 is connected via a manually predetermined adjusted throttle control valve 163 to the exhaust line 114. A parallel hydraulic circuit extending from the return line 153 and a line 165 is connected via a pressure relief valve 166 to the exhaust line 114. The pressure relief valve 166 functions in well known manner to compensate for the sudden surge of pressure occurring upon de-energization of the solenoid 156, as the speed is reduced from a rapid to a creep rate.

It will be apparent that the forward directional control solenoid 150 is energized to effect continued motor operation at creep rate for accurately controlling the movement of the drum 38 to its selected position. Upon arrival of the drum 38 at its selected position, solenoid 150 is de-energized to permit resiliently biased return movement of valve spool 146 to a neutral position, thus stopping motor rotation.

As will hereinafter be more fully explained, stopping of the fluid motor 71 to stop drum rotation is sequentially followed by re-engagement of the index plunger 63 and, slightly later, bodily rearward braking movement of the drum 38.

It will be apparent that counterclockwise or reverse indexing movement is effected by simultaneously energizing a solenoid 167 of the directional valve 145 and the solenoid 156 of rate control valve 155. Thus, the solenoid 167 constitutes a reverse controller and the solenoid 150 is the forward controller for effecting proper directional rotation of the index drum. Energization of solenoid 167 effects leftward movement of the valve spool 146, moving a cannelure 168 into fluid transmitting position between the main supply line 105 and the motor supply line 144. With this condition existing, the return flow of fluid from motor 71 continues through the line 143 and a valve spool cannelure 169 to the rate regulating return line 153. Irrespective of whether the motor 71 is rotating in a forward or reverse direction, reduction from the fast rate to a slow creep rate is effected by de-energization of the solenoid 156 with subsequent stopping of the motor 71 being effected by de-energization of one or another of the solenoids associated with the directional control valve 145.

In accordance with the principles of this invention, sequential actuation of the various solenoid valves shown in Fig. 4 is effected by the electrical control circuit schematically illustrated in Fig. 7. Actual indexing movement is effected automatically by way of the closest index route, and with stopping being controlled electrically without resorting to positive stops or mechanical dogs. Electrical feed back means responsive to the existing drum position operates to indicate the exact angular position of the drum at all times. To accomplish this, there is provided a shaft 172 fixedly secured at its forward end to the drum 38, and extending rearwardly through a horizontally bored opening formed within the circular support member 35 and saddle 30, as shown in Figs. 2 and 4. The shaft 172 thus rotates simultaneously with the drum 38 and is coupled at its extreme rearward end, as shown in Figs. 4 and 5, to drive a position indicating selsyn or synchro 175, that is adjustably secured to a stationary support plate 174. A coupling 176 is interconnected between the extreme rearward end of the shaft 172 and the rotor of the synchro 175. The synchro 175 is operative to provide a continuous feed back voltage phase signal that continuously indicates the exact angular position of the drum 38, irrespective of whether the drum is in stationary indexed position or is being rotatably moved from one index station to another.

For electrically controlling the stopping of the drum 38, a retractable creep-stop switch mechanism 179, as shown in Figs. 5 and 6, is disposed to cooperate with a cam plate 181 connected to be rotated in synchronism with the drum 38 by the shaft 172. The cam plate 181 is adjustably secured to a cam support member 182 by means of cap screws 183, extending through arcuate slots 184 formed in the cam plate 181. The cam support 182 is provided with an internally serrated hub disposed to engage complementary serrations presented by outward end of the shaft 172. The hub of the cam support plate 182 is supported by the inner race of an antifriction bearing 185, the outer race of which is carried within a bored opening formed in the rearward portion of the saddle 30. As shown in Fig. 6, the cam plate 181 is provided with twenty (20) peripherally spaced cam lobes or cams 40C to 59C inclusive. Each of the cam lobes is of identical configuration and comprises a central flat land portion 186 between two contiguous arcuate dwell portions 187 and 188.

It will be apparent that the twenty (20) cam lobes 40C and 59C inclusive presented by the cam plate 181, Fig. 6, are spaced equal distances apart in such a manner as to coincide with the angularly spaced positions of the bored openings 40 to 59 inclusive presented by the indexable drum 38, Figs. 1 and 2. Likewise, the index notches 40A to 59A inclusive are in the same angular relationship, spaced 18 degrees apart, as the cam lobes shown in Fig. 6. With the land 186 of cam lobe 40C positioned intermediately a pair of spaced apart creep-stop switches 191 and 192, as shown in Fig. 6, the beveled index notch 40A, Fig. 4, is so positioned that inward movement of the cooperating tapered index plunger 63 effects a slight final angular positioning of the drum 38 to its precisely located selected station. In this case, as hereinbefore explained with reference to Figs. 1 and 2, the spindle quill 60 is operatively positioned relative to the single operating station 62. The condition assumed is that the cam plate 181 has been indexably advanced from some prior station to the position shown in Fig. 6, in which the switches 191 and 192 are both in open circuit interrupting position to electrically control stopping in the approximate, final selected position.

As shown in Fig. 6, the creep-stop switches 191 and 192 comprise a portion of the retractable switch mechanism 179. The switches 191 and 192 are adjustably secured in spaced apart relationship to a pivotable support bar 193 that is journalled at one end about a stationary shaft 194 secured to the saddle 30. The opposite end of the support bar 193 is normally urged upwardly into engagement with an adjustable stop 195 by means of a spring 196. During final positioning, immediately prior to reduction from rapid to creep rate, the spring 196 urges the entire switch mechanism 179 upwardly in a manner that the switch rollers of the switches 191 and 192 engage the periphery of the cam 181. At the start of any selected indexing movement, during the initial rapid positioning, a solenoid 197 is energized to pivotably move the entire switch mechanism 179 downwardly about the shaft 194, in a manner that both of the switch rollers are retracted from engagement with the periphery of the cam 181, Fig. 6A. The armature of the solenoid 197 is connected by means of a link 198 to the extreme rightward end of the support bar 193.

As viewed from the front of the machine in Fig. 1, the quill supporting bores 40 to 59 in the drum 38 inclusive are numbered in a counterclockwise direction corresponding to the binary code numbering 0 to 19 in Fig. 12. However, any of the quills (irrespective of its number) positioned less than 180 degrees rightward or counterclockwise from the operating station 62, is indexed thereto in a clockwise direction. Likewise, any quill positioned more than 180 degrees from the operating station 62 is advanced thereto in a counterclockwise direction. In the event the particular quill to be indexed is positioned 180 degrees from the operating station 62, indexing is arbitrarily effected in a clockwise direction. In all cases, the direction of indexing is automatically selected relative to the operating station 62, which represents a zero degree position. To provide uniformity with the front view in Fig. 1, corresponding clockwise and counterclockwise designations have been applied to the rearward view of the drum 38, Figs. 2 and 3, and the cam plate 181, Fig. 6.

At the start of any index cycle, the control system is adapted to simultaneously provide two signals, a directional signal circuit (for clockwise or counterclockwise movement) and a creep by-pass signal circuit. The directional signal circuit initiates rapid movement by the required shortest route, and the creep by-pass signal circuit energizes the solenoid to retract the switch mechanism. In Fig. 6, for example, an imaginary phantom line A is shown between the actuating rollers of switches 191 and 192, and bisecting the cam lobe 40C which is positioned to coincidently actuate both of the switches 191, 192 to open position. The imaginary line A corresponds with the zero degree location of the operating station 62, Figs. 2 and 3. Phantom lines B and C are spaced approximately five degrees on either side of line A to indicate the extent of creep movement in approaching the operating station during clockwise or counterclockwise positioning respectively. Assume now, that the quill 45, Fig. 1, is to be advanced into the operating station 62. At the start of the index cycle, the directional signal initiates drum and cam rotation in a clockwise direction, and the creep by-pass signal energizes the solenoid 197 to retract the switch mechanism 179, Fig. 6A. When the selected quill 45 is approximately twelve degrees from the operating station, the creep by-pass signal is interrupted to deenergize the solenoid 197 and permit inward movement of the switch mechanism 179 in a manner that the actuating rollers engage the periphery of the cam 181, and the rapid movement is reduced to a creep rate. However, the original directional signal circuit continues to retain directional control until the selected quill is approximately five degrees from the operating station. At that instant, the original directional signal circuit is interrupted to permit an overlapping directional control circuit established by the coaction of switches 191, 192 with the cam 181 to effect continued indexing at a slow or creep rate for the remaining five degrees of movement. As shown in Fig. 6B, the directional control is then effected by switch 191 being actuated to closed position, and the switch 192, being open since the roller thereof, engages the arcuate dwell portion of the cam lobe 45C. As soon as both switches engage the arcuate dwell portions on opposite sides of the land portion of cam lobe 45C, they are coincidentally open to stop drum movement. The invention is not considered as being limited to exactly twelve degrees and five degrees, for respective interruption of the creep signal and the directional signal. Because of the slight time interval required for the switch mechanism 179 to actually engage the periphery of the rotating cam, a slight delay is required between termination of the signal circuits to establish the overlapping creep-stop circuit, which then functions to control both direction and the reduced creep rate of travel.

In the event indexing is effected in a counterclockwise direction, the switch 191 is open and the switch 192 is actuated to closed position to control the remaining five degree portion of the index cycle. Upon arrival of the drum at the approximate final selection station, coincident operation of both switches 191 and 192 again operates to effect electrical stopping of drum and cam rotation. Due to a necessary slight differential or overlap in the operation of switches 191 and 192, there is a slight angular misalignment of the drum relative to the operating station 62. This misalignment necessitates the slight, final positioning effected by coaction between the index plunger and one or another of the beveled index notches 40C to 59C.

As taught by the present invention, the extent of the selected index movement is determined by establishing a predetermined angular reference phase (of constant voltage) that is compared with the existing angular feed back phase (of constant voltage) established by the existing indexed position of the rotatable spindle drum. In accordance with the difference between these two voltage phases, the drum 38 and cam plate 181 are caused to be rotated in the required direction at a rapid rate, with the reduction from rapid to creep rate being automatically effected at the same predetermined distance twelve degrees from the operating station.

To accomplish this, as shown in Fig. 7, a phase converter 202 is interconnected in series by a transformer 203 to a phase shift network 204, the latter being connected via conductors 207 and 208 to supply a reference phase signal to a vector difference detector 210. The voltage supplied by conductors 207 and 208 is substantially constant, the phase varying in accordance with the next selected index position of the rotatable spindle drum 38 and cam plate 181. The vector difference detector 210 is connected to receive another phase signal via conductors 211 and 212 from the position indicating synchro 175. The synchro 175 functions as an induction phase shifter, or rotatable selsyn transformer. Actually, as shown in Fig. 7, conductors 207 and 211 are connected via a common conductor 213 to the detector 210.

The vector difference detector 210 operates as a comparator to provide both an indication of the absolute difference between the input signals and the difference in polarity between the input signals. The conductors 211 and 212 are directly connected at their opposite ends to a rotor winding 214 of the synchro 175. Depending upon the existing, rotatably adjusted position of the drum, the rotor winding 214 is inductively energized by associated field winding 215 and 216, the output voltage phase through conductors 211 and 212 representing the existing angular position of both the rotor winding and the spindle drum. The synchro field winding 215 is interconnected to be energized by a transformer winding 219, and the field winding 216 is connected to be energized by a transformer winding 220.

To maintain electrical synchronism in the entire system, the field winding 219 is wound about the same core (not shown) as the windings $T_1$ of the phase converter 202. Likewise, the transformer winding 220 is wound about the same core (not shown) as the windings $T_2$ of the phase converter 202. Thus, although the transformer windings 219 and 220 are electrically isolated from the windings $T_1$ and $T_2$ of the phase converter 202, the windings 219 and 220 are inductively energized from a common source to provide the proper phase relationship to the synchro field windings and, subsequently, to the synchro rotor winding 214, in accordance with the angularly adjusted position thereof.

It will be apparent that the phase converter 202 actually comprises two interconnected auto-transformers having input terminals 223, 224, and 225 connected to be energized by three phase, 440 volt line conductors 227, 228 and 229. As is well known in the art, 224 and 225 are common terminals, functioning both as input and output terminals. By means of this arrangement; the output terminals of the phase converter 202 indicated at 230, 225, 231, 232, and 224 are respectively disposed to provide five constant voltage output phases, spaced 72 electrical degrees apart.

The output terminals 230, 225, 231, 232 and 224 are individually connectable, depending upon the next selected index position, to one terminal of a primary winding 234 associated with the transformer 203. The opposite terminal of the primary transformer winding 234 is connected via a single conductor 235 to a neutral terminal 236.

The phase shift network 204, depending upon its selected adjustment, is operative to provide additive voltage phase shifts of zero (0) degrees, 18 degrees, 36 degrees and 54 degrees. Inasmuch as the phase converter 202 and the phase shift network 204 are interconnected in series by the transformer 203, it will be apparent that 20 different reference voltage phases spaced 18 electrical degrees apart are available from the output conductors 207 and 208.

The phase shift network 204 is energized by a secondary winding 238 of the transformer 203, in accordance with the selected phase energization of the primary winding 234. The output conductor 207 of the phase shift network is connected to a center tap on the transformer secondary winding 238. The upper terminal of the secondary winding 238 is connected to a conductor 239. A capacitor 241 is operatively interconnected between the opposite terminal of transformer secondary winding 238 and a conductor 242, and a tapped resistor 244 is connected between the two conductors 239 and 242.

To selectively control the output from the phase shift network 204, there are provided a pair of coordinately energizable relays 246 and 247. With both of the phase shift relays 246 and 247 deenergized, the conductor 239 is connected via an upper closed contact bar 248 of the relay 246 to a conductor 249. From the conductor 249, the circuit continues via an upper closed contact bar 250 of deenergized relay 247 to the conductor 208. With this condition existing, the output conductors 207 and 208 are connected to supply a signal phase to the vector difference detector 210 that coincides with the selected adjustment of the phase converter 202. This input signal phase would then be zero degrees, 72 degrees, 144 degrees, 216 degrees, or 288 degrees.

To provide an additive 18 degree phase shift from the network 204, relay 246 is energized to effect closure of a contact bar 251. With this condition existing, a tap on the resistor 244 is connected via a conductor 253, closed contact bar 251 to a conductor 254, and thence through the closed contact bar 250 of relay 247 to the output conductor 208.

In a similar manner, to provide a 36 degree phase shift, relay 246 is deenergized and relay 247 is energized, thereby opening the contact bar 250 and closing a contact bar 256. With this condition existing, another tap on the resistor 244 is connected via a conductor 257, through normally closed contact bar 258 of deenergized relay 246 to a conductor 259. From the conductor 259, the 36 degree phase siganl continues via the closed contact bar 256 to the output conductor 208. To provide a 54 degree phase shift, both of the control relays 246 and 247 are energized to interrupt the transmission of current from conductors 239, 253, and 257. With this condition existing, the conductor 242 directly energizes conductor 208 which then cooperates with conductor 207 to provide an angular reference phase corresponding to a selected position of 54 degrees.

To selectively adjust the output phase from the converter 202, there are provided three control relays 261, 262, and 263. With all of the relays 261, 262 and 263 deenergized the upper contact bars 267, 268 and 269 respectively associated therewith are in normally closed position to complete a circuit from the zero degree output terminal 230 to the upper terminal of the primary transformer winding 234. The circuit from output terminal 230 continues via a conductor 271, and thence through the closed contact bars 267, 268 and 269 to a conductor 272 connected directly to one terminal of the primary winding 234, the opposite terminal of which is connected via the conductor 235 to the central neutral terminal 236. With this condition existing, it will be apparent that the other contact bars associated with the relays 261, 262 and 263 operate to interrupt circuits from the four other phasec onverter output terminals 225, 231, 232 and 224.

In a similar manner, the phase converter 202 is connectable to provide a 72 degree signal phase by energizing relay 261, and retaining relays 262, 263 deenergized. A normally open contact bar 274 of the relay 261 is then moved to closed position, thereby completing a circuit from the 72 degree output terminal 225 via a conductor 275, and closed contact bars 274, 268, 269 to the conductor 272.

The 144 degree output phase signal is effected by energizing the control relay 262, while relays 261 and 263 are deenergized. The resulting 144 degree phase circuit is completed from the output terminal 231 via a conductor 277 connected to the normally closed contact bar 278 of deenergized relay 261 to a conductor 279. From the conductor 279, this circuit continues through a closed contact bar 281 of energized control relay 262, and thence through the normally closed contact bar 269 to the conductor 272.

The 216 degree output phase circuit is completed by coordinately activating the control relays in a manner that relays 261, 262 are energized and relay 263 is deenergized. With the phase converter 202 conditioned for a 216 degree output phase, the terminal 232 is connected via a conductor 283 and the closed contact 284 of energized relay 261 to the conductor 279. From the conductor 279, this circuit continues via closed contact bar 281 of energized control relay 262 and thence through the normally closed contact bar 269 to the conductor 272.

The last, or 288 degree output signal phase, is obtained by energizing control relay 263, with relays 261 and 262 being deenergized. During a 288 degree output adjustment, the output terminal 224 is connected via a conductor 285, and thence through normally closed contact bars 286 and 287 to a conductor 288A. The conductor 288A, in turn, is connected via the closed contact bar 299 of energized control relay 263 to the conductor 272.

As shown in Fig. 7, it will be apparent that only one of the phase converter output terminals 230, 225, 231, 232 and 224 is connected to the input conductor 272 at any given time, depending upon the coordinate activation of the control relays 261, 262 and 263. In a like manner, the phase shift network 204 is adjustable, depending upon the coordinate energization of control relays 246 and 247, to provide phase shifts of zero (0) degrees, 18 degrees, 36 degrees or 54 degrees. These control relationships are clearly illustrated in Fig. 12, in which the resultant angular output reference phase is indicated in the column entitled Selected Drum Position. Concomitant adjustment of the phase converter 202 and the phase shift network 204 provides the required, selected output reference phase from conductors 207 and 208 connected to the vector difference detector 210.

The vector difference detector 210 is operative to determine the direction of a selected indexing movement, as well as the extent or duration of the rapid rate of this movement. To facilitate the description, as shown in the enlarged fragmentary diagrammatic view in Fig. 8 the vector difference detector 210 is represented as comprising a contact making phase difference meter 288 and a contact making voltmeter 289. The common input conductor 213 from rotor winding 214 and phase shift network 204 is connected to contacts 290 and 291 respectively presented by the phase meter 288. Likewise, the other input conductor 212 from the rotor winding is connected to the input terminals 292 and 293 of the meters 288 and 289. The reference phase conductor 208 is connected to terminals 296 and 297 provided by the meters 288 and 289. The meters 288 and 289 are respectively provided with pivotably movable contact bars 302 and 303, associated with armature windings 306 and 307 for effecting movement thereof in response to exciting windings 309 and 310 interconnected between terminals 290, 296 and 291, 292 respectively. It will be apparent that, in a similar manner, an exciting winding 312 operatively interconnected between the terminals 293 and 297 activates the winding 307. The movable contact bar 302 of the phase difference meter 288 is connected to be energized by a control conductor 314. In the event the difference between the reference phase and the positioning phase is less than 180 degrees, the movable contact bar 302 is urged into engagement with a contact terminal 315 connected via a conductor 316 to supply a clockwise or forward positioning signal. The contact bar 302 is retained in engagement with the terminal 315 for the extent of actual clockwise movement minus five degrees. Whenever the difference between the reference phase input and the positioning phase input signal is greater than 180 degrees, the movable contact bar 302 is urged into engagement with a terminal contact 317 connected via a conductor 318 to supply a counterclockwise or reverse positioning signal. The contact bar 302 is retained in engagement with the terminal 317 for a distance equal to the actual counterclockwise angle to be traversed minus five degrees.

The conductor 314 is likewise connected to complete a circuit to the pivot terminal for the movable contact bar 303 of the contact making voltmeter 289. Regardless of whether indexing is to take place in a clockwise or a counterclockwise direction, the movable contact bar 303 is urged into current transmitting engagement with a terminal 320 connected via a conductor 321 to complete a creep by-pass signal circuit. The movable contact bar 303 is retained in engagement with the terminal 320 for the actual angular extent of either clockwise or counterclockwise indexing movement minus approximately 12 degrees. Whenever the indexing movement to be effected is exactly 180 degrees, as will hereinafter be explained, clockwise indexing is initiated by a circuit completed to the creep by-pass conductor 321, with no circuit being completed to either of the conductors 316 or 318 at the start of a 180 degrees index cycle.

Power for energizing the various power actuated and control elements of the electrical control system is derived from a three phase, 440 volt source connected through the usual fused disconnect switch (not shown) to energize line conductors $L_1$, $L_2$ and $L_3$. Conductors $L_1$ and $L_2$ are connected to energize the primary winding of a transformer 326, the secondary of which is connected to supply current of reduced voltage to energize control conductors 327 and 328. To energize the control system, a start button switch 329 is momentarily depressed, thereby completing a circuit from the conductor 328, a normally closed master stop switch 330 to a conductor 331. The conductor 331 is connected to energize the coil of a master control relay 332 connected at its opposite terminal to the energized conductor 327. Upon energization of the relay 332, a holding circuit is completed from the conductor 331, a conductor 333 and a closed contact bar 334 of the relay 332, thence through the closed stop switch 330 to the conductor 328. Closing of the relay 332 completes another circuit from the energized conductor 328 via a closed lower contact bar 335 to energize a control conductor 336. The conductor 327 is connected directly to energize another control conductor 314. With the relay 332 retained in energized closed position, the three upper contact bars thereof are closed to transmit current from line conductors $L_1$, $L_2$ and $L_3$ for energizing the pump driving motor 104. At the same time, contact bars 337, 338, and 339 are retained in closed position to transmit current from line conductors $L_1$, $L_2$ and $L_3$ to the conductors 229, 228 and 227 respectively connected to energize the five phase converter 202.

After the circuit has been energized, the various control elements are activated in accordance with the actual positions of the various mechanically interconnected elements in the operating structure. It will be assumed that upon initial energization of the control circuit, the quill carrying bore 40 is positioned adjacent the single operating station 62, Fig. 2. Likewise, it will be assumed that five coordinately positioned selector switches 340 to 344 inclusive, Fig. 7, are in open position. With the selector switches in open position, the phase shift relays 246, 247 and phase converter control relays 261, 262 and 263 are deenergized to adjust the phase shift network 204 and phase converter 202 for the zero degree position as indicated in code form in Fig. 12. Energization of one or another of the selector switches 340 to 344 inclusive, Fig. 7, effects a corresponding energization of the conductors 346 to 350 inclusive, thereby energizing a corresponding one of the relays 246, 247, 261, 262 and 263. To effect coordinate activation of selector switches 340 to 344 inclusive, there is provided a single remotely located selector switch mechanism 351, Fig. 9. The selector switch mechanism 351 is operable to activate the five selector switches for effecting the required angular indexing movement of the spindle carrying drum 38 in any predetermined sequence of indexing movements, and in accordance with the selector switch positions graphically illustrated in Fig. 12.

As shown in Fig. 9, the selector switch mechanism 351, comprises essentially a hollow housing 354 adapted to support the selector switches 340 to 344 inclusive in diametral relationship. Another switch 353 is positioned between selector switches 342 and 343. To enclose the housing 354, a circular support plate 355 having a central bored opening is secured to the peripherally flanged edge of the housing 354. Another support plate 357 provided with a concentrically formed bored opening is secured to the plate member 355 in slightly spaced apart forward relationship. An enlarged circular flanged guide member 358 is fixedly secured within the concentric bored openings respectively presented by the support plates 355 and 357. A manually movable drum selector dial 359 is secured to the outer end of a shaft 360 that is, in turn, pinned at its inner end to the enlarged hub 361 of a selectively positionable cam plate 362. The cam plate hub and shaft 360 secured thereto are supported by the circular flanged member 358 for both axially and rotatable movemnet. Normally, as shown in Fig. 9, a spring 364 seated at one end within an enlarged circular recess formed within the flanged member 358 is seated at its opposite end against the face of the cam hub 361, thus urging the cam plate 362 inwardly to a position for activating the selector switches 340 to 344 inclusive in coordinated relationship. With the cam plate 362 urged inwardly by the spring 364, one of a plurality of peripherally spaced index notches 365 formed in the cam plate 362 is engaged by a stationary key 366 secured within the housing 354. As shown in Figs. 9 and 10, 11 the index notches 365 are peripherally spaced about the cam plate 362 to correspond with indicia 367 presented by the drum selector dial 359 and adapted to be read against a pointer 368 carried by the circular support member 357. Whenever the selector dial 359 is positioned as shown in Fig. 9, the cam plate 362 is angularly adjusted in a manner that arcuate cams 370 and 371 secured thereto depress the actuating plungers of switches 341 and 343, corresponding to the 180 degree position shown in Fig. 12. The exact points at which cams 370 and 371 of the rotatable cam plate 362 will engage the switches 341 and 343 respectively is indicated in the elevational view of the cam plate shown in Fig. 10. However, in Fig. 10, the cam plate 362 is so positioned that none of the selector switches 340 to 344 inclusive is actually engaged by one or another of the cams indicated by the shaded areas, the angular position of the cam plate shown coinciding with the zero degree index position indicated in Fig. 12. To obviate the necessity for applying individual reference numerals to the various cams presented by the cam plate 362 and indicated by the shaded areas in Fig. 10, a series of imaginary diametral lines have been superimposed thereon. Thus, whenever the cam plate 362 is rotated in clockwise direction from its zero degree position shown in Fig. 10 the various cams indicated by the shaded areas are moved into switch actuating position, in accordance with the angularly spaced diametral lines. Whenever the selector dial 359 is adjusted for a different index position, it is first withdrawn axially in a manner that one of the index notches 365 is disengaged from the stationary key 366. As this happens, the inner end of the rotatable shaft 360 is likewise axially withdrawn to deactuate a circuit interrupting switch 353 to immediately stop any index cycle that may be then occurring. While being axially withdrawn, the selector dial 359 is then rotated to position the selected angular indicating indicia 367 opposite the pointer 368. The dial 359 is then released, permitting the spring 364 to urge the cam plate 362 inwardly to switch actuating position.

Referring again to Fig. 7, the position indicating selsyn 175 is operative to provide a zero degree signal phase to the vector difference detector 210, corresponding to the zero degree position of the quill carrying drum 38., Fig. 2. With the master control relay 332 energized, and all of the selector switches 340 and 344 inclusive in open position a reference phase signal of zero degrees will likewise be supplied from the phase shift network 204 to the vector difference detector 210. Since the reference phase signal corresponds to the position indicating phase signal, the vector difference detector 210 is not actuated to provide output signals via the conductors 316, 318 and 321. With this condition existing, and relay 332 energized, it will now be assumed the drum selector switch is moved to the 90 degree position, switches 340 and 342 then being retained in actuated closed position. With switches 340 and 342 in closed position, circuits are immediately completed to energize control relays 246 and 261 thereby adjusting both the network 204 and converter 202 to provide a resultant phase output signal of 90 degrees to the vector difference phase detector 210. Since the position phase signal is zero degrees, a 90 degree reference phase signal immediately activates the vector difference detector 210 in a manner to simultaneously energize both the forward signal conductor 316 and the creep by-pass conductor 321. As hereinbefore described with reference to Fig. 6, the shortest index route is in a clockwise direction, since the cam lobe 40C is in the zero degree operating station between switches 191 and 192, at the start of the selected index movement. Energization of the forward conductor 316 and creep by-pass conductor 321 in response to activation of the phase difference detector 210 immediately conditions the control circuit for the subsequent required indexing movement. Indexing movement is not effected, however, until an index cycle start button switch 375 is momentarily depressed.

Energization of the forward control conductor 316 completes a circuit for energizing the coil of a forward control relay 376, the circuit being completed via a conductor 378 connected to the energized control conductor 336. Energization of the relay 376 to closed position completes a circuit from the conductor 336, via the closed contact bar of the relay to a conductor 380 connected to a conductor 381. The circuit from conductor 381 continues via the normally closed contact bar of a reverse relay 382, to a conductor 383. From the conductor 383, the circuit continues through the coil of a relay 384 to a conductor 385 connected through the coil of a relay 386 to the energized control conductor 314. Energization of the relay 384 effects closure of a contact bar 389 into bridging engagement with associated conductors 390 and 391. In a similar manner, energization of the relay 386 effects closure of a contact bar 394 into bridging engagement between conductors 395 and 396.

At the same time, the energized conductor 321 from the vector difference detector 210 is connected to energize a creep by-pass relay 397, this circuit being completed via a conductor 398 connected to the energized control conductor 336. Energization of the relay 397 effects closure of a contact bar to complete a circuit from the conductor 336 to a common conductor 401 connected to a conductor 402 for activating a relay 403. Energization of the relay 403, in turn, effects movement of a contact bar 404 to open position, to prevent energization of an index completed relay 406. In order to start an index cycle by momentarily depressing start button switch 375, it is necessary that the index finish relay 406 be deenergized in a manner that a contact bar 407 associated therewith is retained in its normally closed position.

In addition to the conductor 402, the common conductor 401 is simultaneously disposed to energize conductors 412, 413 and 414. Conductor 412 is connected to energize the solenoid 197 for retracting the creep-stop switch mechanism 179, Fig. 6. Movement of the switch mechanism 179 to lower retracted position operates to permit the contact bars of switches 191 and 192 to be retained in normally open position as shown in Fig. 7, and prevents closure of either switch during indexing. The conductor 413 is connected directly to energize the coil of a time delay relay 415, the contact bar 416 associated therewith immediately being moved into bridging engagement between a pair of associated conductors 417 and 418. Subsequently, after the index cycle has been completed, the return of contact bar 416 to the position shown in Fig. 7 is delayed slightly upon deenergization of relay 415. To complete the required conditions necessary to start an index cycle, conductor 414 is connected to energize the rate control valve solenoid 156, Figs. 4 and 7, in a manner that the subsequent selected index cycle may immediately be started at the rapid rate. It will be noted that the various control conditions established by simultaneous energization of the forward motor control relay 376 and the creep by-pass relay 397 do not include retracting the index plunger or releasing the drum clamp, these functions being continued until the selected index cycle is actually initiated by momentarily depressing the cycle start switch 375.

After the circuit conditions for effecting a zero degree to 90 degree index movement have been completed, the index cycle is initiated by momentarily depressing the cycle start switch 375. The starting circuit is completed from conductor 336, the closed contact bar of switch 375, a conductor 420, and the closed switch 353 to conductor 421. Inasmuch as the selector switch 342 is in closed position for the selected index cycle, the phase converter relay 261 is energized and a lower contact bar 422 associated therewith is retained in open position. With this condition existing, therefore, the starting circuit continues from conductor 421, a conductor 423, a conductor 424, the normally closed lower contact bar of deenergized control relay 263 to a conductor 425. From the conductor 425, the starting circuit continues via the normally closed contact bar 407 of deenergized index completed relay 406, to a conductor 426 that is connected to energize the coil of an index start relay 430. Energization of the index start relay 430 simultaneously completes a holding circuit for sealing the start relay in closed position; for sequentially releasing the index plunger and then releasing the drum clamp; and, after these functions have been completed, initiating clockwise indexing movement at the rapid rate. A holding circuit for retaining the index start relay 430 in energized closed position is completed from the conductor 420, a conductor 431, closed contact bar 432, conductor 391, closed contact bar 389 of energized relay 384 to the conductor 390.

Upon energization of the index start relay 430, closure of a contact bar 433 completes a plunger retracting circuit, and closure of a contact bar 434 conditions the circuit for return movement of the index plunger after indexing has been completed. The circuit for moving the index plunger inwardly, however, is interrupted by a contact bar 436 that is retained in open position by the energized forward relay 386.

The circuit for retracting the index plunger 63, Fig. 4, is completed from the energized conductor 336, Fig. 7, the conductor 417, closed contact bar 416 of energized relay 415 to the conductor 418. From conductor 418, the plunger retracting circuit continues via the closed contact bar 433 to a conductor 437, conductor 395, the closed contact bar 394 of energized relay 386 to a conductor 396. The conductor 396, in turn, is connected to energize the plunger retracting solenoid 125, the opposite terminal of the solenoid being connected to the energized control conductor 314. Outward movement of the retracting plunger 63, Figs. 4 and 7, deactuates the switch 129, the contact bar thereof then moving into bridging engagement between associated conductors 439 and 440. Continued movement of the index plunger 63 to fully retracted position actuates the switch 130 into closed position effecting an operative connection between conductors 443 and 444. Deactuation of the switch 129 completes a drum unclamping circuit from the energized conductor 336, conductor 439, and a conductor 440 to energize the drum unclamping solenoid 119. As soon as the drum 38, Fig. 4, is moved to forward unclamped position, pressure switch 122 is actuated to closed position completing a circuit from conductor 444 to a conductor 445. Upon movement of the pressure actuated switch 122 into upward closed position, a circuit is immediately completed to initiate rapid indexing movement of the drum 38 in the required clockwise direction. This circuit extends from conductor 336, a conductor 448 and the closed contact bar 434 of energized index start relay 430 to a conductor 449. From the conductor 449, the forward starting circuit continues via the conductor 443, closed switch 130, conductor 444, and closed pressure actuated switch 122 to the conductor 445. The starting circuit is completed from the conductor 445 through a closed contact bar 446 of the energized relay 386 to a conductor 447 connected to energize the forward motor solenoid 150.

It will be apparent that energization of the index start relay 430 effects a relatively simultaneous, sequential retraction of the index plunger, unclamping of the index drum, and starting of the fluid actuated motor 71, Fig. 4, for effecting clockwise indexing movement. The rapid, clockwise rate of indexing movement from the zero degree to the 90 degree position continues until the drum is approximately twelve degrees from the operating station 62. As soon as this occurs, the vector difference detector 210 operates to deenergize the creep by-pass conductor 321, and the creep by-pass relay 397, which then drops to an open position interrupting the circuit to the common conductor 401. Deenergization of the common conductor 401, in turn, effects deenergization of the switch mechanism retracting solenoid 197, the time delay relay 415, and the creep by-pass solenoid 156. At the same time, deenergization of conductor 402 interrupts the circuit to the coil of the relay 403, permitting the contact bar 404 thereof to drop to a normally closed position conditioning the circuit for energizing the index completed relay 406. With the drum unclamped, during indexing movement, however, pressure switch 118 is in open position to prevent energization of the relay 406.

Deenergization of the creep by-pass solenoid 156 operates to reduce the rapid indexing rate to a creep rate, although directional control is still effected by the energized forward relay 376. After a slight delay, the contact bar 416 is moved to the position shown, upon deenergization of the relay 415. Downward movement of the contact bar 416 interrupts the circuit to conductor 418 to deenergize the plunger retracting solenoid 125, permitting resiliently biased movement of the valve spool 132, Fig. 4, to its central neutral position. Likewise, downward movement of the contact bar 416 completes a circuit from energized conductor 417 to a conductor 451 connected to the conductor 391 in a manner to establish an overlapping holding circuit to retain the index start relay 430 in energized closed position. Deenergization of the retracting solenoid 197, Figs. 4, 6B and 7, permits resiliently biased upward movement of the switch retracting mechanism 179. Thereupon, the actuating roller of forward control switch 191 is moved to closed position by being moved into engagement with the flat land portion of cam lobe 45C, Fig. 6B. The actuating roller of reverse switch 192 engages the arcuate dwell portion rightwardly of the cam lobe 45C, and is retained in deactuated open position. Closure of switch 191 immediately establishes an overlapping forward control circuit from energized conductor 336, a conductor 452, and the closed contact bar of forward creep-stop switch 191 to the conductor 381. Actually, depending upon the speed of drum rotation, the overlapping circuit conditions established by movement of the actuating rollers of switches 191, 192 are effected within a range of seven degrees, i.e. as the drum continues to rotate in a clockwise direction through the twelve degree position to the five degree position.

As the drum rotates through a position approximately five degrees from the operating station, the vector difference detector 210 operates, to deenergize the conductor 316, permitting deenergization of the forward control relay 376. At this moment, the overlapping circuit already established through closed forward creep-stop switch 191 maintains the holding circuit to the conductor 381, thus maintaining the relays 384 and 386 energized. Clockwise creep indexing movement then continues until the cam lobe 45C is positioned between the actuating rollers for the switches 191 and 192. As soon as this occurs, the switch 191 moves to its open position, Fig. 7, to interrupt the circuit to the conductor 381 to deenergize relays 384 and 386 for stopping clockwise indexing movement. Immediately upon deenergization of the relay 386, the contact bar 446 is moved to open position, deenergizing the forward motor solenoid 150. Thus, as shown in Fig. 4, the directional control valve spool 146 is resiliently biased to its central neutral position in a manner to supply pressure fluid through both of the hydraulic lines 143 and 144 to stop the fluid motor 71. Movement of the contact bar 436 to closed position upon deenergization of relay 386 completes a circuit energizing the solenoid 140 to effect inward movement of the index plunger 63, Fig. 4, for effecting final positioning of the index drum 38. As shown in Fig. 7, the circuit for energizing the plunger control solenoid is completed from the energized conductor 314, the normally closed contact bar 454 of a deenergized relay 455, and thence through the normally closed contact bar 436 to a conductor 456. From the conductor 456, the circuit continues through the closed contact bar 434 of energized relay 430 to a conductor 448 connected to the energized control conductor 336.

Movement of the plunger 63 inwardly into final positioning engagement with the index notch 45A, Fig. 4, deactuates the switch 130 and actuates the switch 129 to upwardly closed position in engagement with a terminal connected to conductor 460. Upward movement of the position indicating switch 129, as shown in Fig. 7, interrupts the circuit to the conductor 440 thus deenergizing the drum unclamping solenoid 119, permitting resiliently biased movement of the valve spool 107 to a position for reclamping the spindle drum 38 in the selected index position. As soon as the drum 38 is fully clamped, pressure switch 118 is actuated to closed position to complete a circuit for energizing the index completed relay 406, a contact bar 407 thereof being moved upwardly to deenergize the index start relay 430. As shown in Fig. 7, the index completed circuit extends from the energized control conductor 336, via the conductor 439, the upwardly closed switch 129 to the conductor 460. From the conductor 460, this circuit continues through the closed contact bar of pressure actuated switch 118, and the closed contact bar 404 of deenergized relay 403 to energize the relay 406, this circuit being completed via a conductor 461 connected to the energized conductor 314. With a contact bar 407 of the relay 406 retained in upward open position, the index start relay 430 is deenergized to condition the control circuit for a subsequent indexing movement, upon moving the drum selector dial 359, Fig. 9, to a new selected position, and then momentarily depressing the index cycle start switch 375, Fig. 7.

It is not deemed necessary to describe in detail the exact circuit conditions existing for effecting clockwise indexing movement from other existing index positions of the drum 38. In all cases, the vector difference detector 210 is adapted to establish a forward position signal via the conductor 316 and a creep by-pass signal via the conductor 321 whenever the existing drum position is less than 180 degrees from the selected index position. Upon simultaneous energization of the forward relay 376 and creep by-pass relay 397 in response to momentary closure of the index cycle start switch, indexing is always effected in a clockwise direction. When indexing in a clockwise direction, the automatic circuit conditions established upon closure of the start switch 375 and energization of the index start relay 430 are identical to that hereinbefore described for advancing the quill bore 45, Fig. 1, to the single operating station 62.

In a similar manner, the vector difference detector 210 is operable to automatically effect counterclockwise indexing movement whenever the difference between the reference phase signal and the position phase signal is greater than 180 degrees. In such a case, the vector difference detector 210 simultaneously completes a creep by-pass signal via the conductor 321 and a reverse or counterclockwise signal via the conductor 318. Energization of the creep by-pass relay 397 is operative, as hereinbefore explained, to complete holding circuits for simultaneously energizing the switch mechanism retracting solenoid 197, time delay relay 415, creep by-pass solenoid 156, and the relay 403. At the same time, completion of a circuit through conductor 318 effects energization of a reverse motor control relay 464, moving the contact bar associated therewith into bridging engagement between conductors 465 and 466. With the reverse relay 464 energized to closed position, the circuit continues from the conductor 466 via a normally closed contact bar of deenergized relay 384 to energize the relays 382 and 455. Energization of the relay 382 effects upward movement of a contact bar 467 into upwardly closed position.

Energization of the relay 455 effects upward movement of a contact bar 468 to closed position to permit energization of the plunger retracting solenoid 125. In like manner, a lower contact bar 469 is moved to closed position for effecting subsequent energization of the counterclockwise solenoid 167 for effecting reverse indexing movement. With these conditions established, a counterclockwise indexing cycle may be initiated by momentarily depressing the start button switch 375 to energize the index start relay 430 to upward closed position, a holding circuit being completed via the upwardly closed contact bar 432 and closed contact bar 467. Closure of contact bar 433 of energized relay 430 operates to energize the plunger retracting solenoid 125, operating both to actuate position indicating switch 130 to upward closed position and to deactuate switch 129. Deactuation of switch 129, in turn, completes a circuit from conductor 439 to the conductor 440 for energizing the drum unclamping solenoid 119. With the drum in fully unclamped position, pressure actuated switch 122 is moved to closed position to complete a circuit via the closed contact bar 469 for energizing the reverse motor starting solenoid 167. Inasmuch as the creep by-pass solenoid 156 has already been energized upon energization of the creep by-pass relay 397, counterclockwise indexing movement is immediately initiated at a rapid rate. As the drum approaches a point approximately twelve degrees from the operating station, the vector difference detector 210 deenergizes the creep by-pass conductor 321 and creep by-pass relay 397. Thereupon, the relay 156 is deenergized to reduce the rapid rate to a creep rate, and the retracting solenoid 197 is deenergized to permit resiliently biased upward movement of the switch mechanism 179, Fig. 6.

In approaching the operating station in a counterclockwise direction, it will be apparent that the forward switch 191 is deactuated, since the roller thereof engages one or another of the arcuate dwell portions of the cam lobes 40C to 59C respectively. Likewise, the actuating roller of the reverse creep-stop switch 192 is engaged by the corresponding land portion of the same cam lobe presented by the cam plate 181. Closure of the reverse switch 192, Fig. 7, completes an overlapping energized holding circuit through the closed contact bar of deenergized relay 384 for maintaining relays 382 and 455 energized. Counterclockwise indexing movement at creep rate is continued as the drum rotates through a five degree position, at which time the vector difference detector 210 operates to deenergize the reverse conductor 318 and the reverse motor control relay 464. Inasmuch as the switch 192 has already been moved to closed position, however, indexing movement at creep rate continues until both of the actuating rollers associated with the creep-stop switches 191 and 192 are engaged by the arcuate dwell portions of the cam lobe corresponding to the selected indexed position. As this occurs, reverse switch 192 is moved to deactuated open position interrupting the circuit, to permit deenergization of relays 382 and 455. Immediately upon deenergization of relay 455, the lower contact bar 469 is moved to normally open position to deenergize the reverse motor solenoid 167. After the reverse solenoid 167 is deenergized, the valve spool 146 is resiliently biased to neutral position bringing the fluid motor 71 to a stop, as shown in Fig. 4. After this has occurred, as shown in Fig. 7, the remaining circuit conditions for re-engaging the index plunger 63, moving the drum 38 to a clamped or brake position, and subsequently energizing the index finished relay 406 are identical for both counterclockwise indexing movement and clockwise indexing movement.

In the event the quill to be indexed is in a diametrically opposed position 180 degrees away from the working station 62, the extent of indexing movement is exactly the same in either a clockwise or counterclockwise direction. In the event a 180 degree indexing movement is required, however, the vector difference detector 210 is always operative to initiate movement in a clockwise direction.

Figure 8:
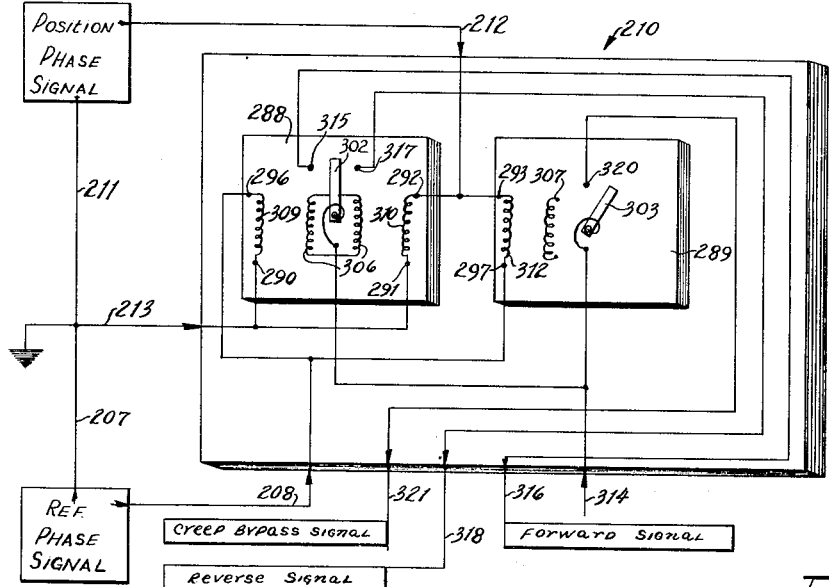
Fig. 8 is a fragmentary schematic electrical circuit illustrating the phase difference detector or phase comparator.

With the selector dial 359, Fig. 9, positioned to require indexing of 180 degrees, there will be a 180 degree difference between the position phase signal and reference phase signal respectively supplied to exciting windings 309 and 310, Fig. 8. With this condition existing, at the start of a 180 degree index cycle, the contact bar 302 of the phase difference meter 288 will remain in neutral position (as shown), and no circuit is completed through either the forward signal conductor 316 or the reverse signal conductor 318. At the same time, the contact making voltmeter 289 is energized to activate the movable contact bar 303 thereof for completing a circuit to the creep by-pass conductor 321. With these conditions established, depressing the index cycle start switch 375 operates to initiate a 180 degree index movement at rapid rate. Inasmuch as neither of the conductors 316 or 318 are energized, and neither the forward relay 376 or reverse relay 464 are energized, energization of the creep-stop relay 397 alone functions to initiate a rapid 180 degree index due to energization of the conductor 321. With relay 397 energized, as shown in Fig. 7, an upper contact bar 470 is closed to complete a circuit from conductor 336; through normally closed contact bars 471, 472 respectively associated with deenergized relays 376, 464; to a conductor 473. From energized conductor 473, this directional starting circuit continues via conductor 381 to energize forward start relay 384 which functions as hereinbefore explained to effectuate the other circuit conditions required for starting the rapid index cycle. Likewise, closure of the lower contact bar of relay 397 completes a circuit to conductor 401 for energizing relays 403, 415 and solenoids 156, 197. Although closure of the upper contact bar 470 initiates rapid 180 degrees clockwise indexing movement, this circuit is interrupted after the drum has been actually displaced a few degrees in a clockwise direction. Angular displacement of the drum and rotor winding 214 so activates the vector difference detector 210 as to effect energization of the clockwise or forward conductor 316. Thereupon, energization of forward relay 376 is effected to open the contact bar 471 and interrupt the original starting circuit completed to the conductor 473. The clockwise directional control circuit is then completed via the closed lower contact bar of the energized forward relay 376 to the conductors 380 and 381 to retain the relay 384 energized. After the forward relay 376 is energized, the 180 degree index cycle is completed in a clockwise direction with subsequent reduction from rapid to creep rate, electrical stopping upon coincident deactuation of switches 191 and 192 being effected as hereinbefore described for any other clockwise indexing movement.

Figure 13:
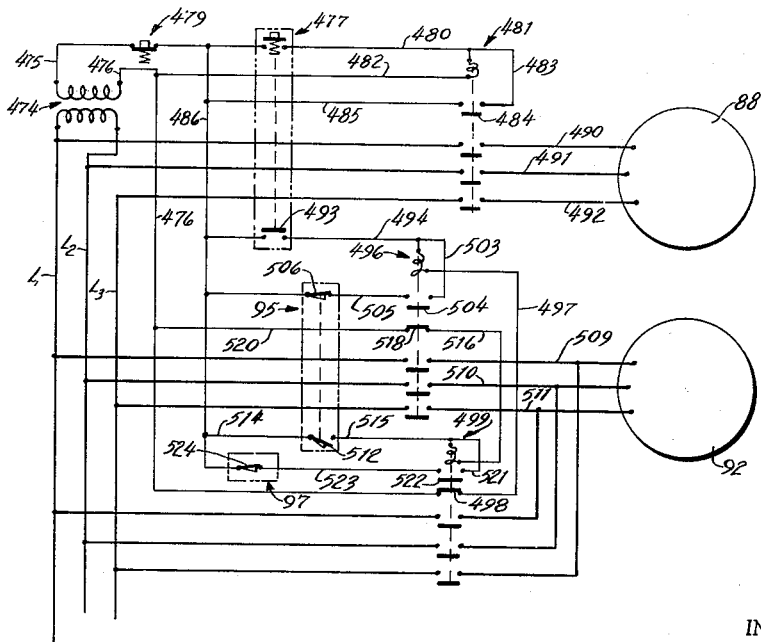

Whenever one or another of the quills carried by the bored openings 40 to 59 inclusive of the drum 38 are indexably advanced to the single working station 62, the feed motor 92 and spindle motor 88 are energizable to advance the drive unit 85, Fig. 3, for effecting a working cycle, i.e. actually moving the quill 60 forward and rotating the tool spindle 81 during a working cycle, as well as retracting the quill and its associated spindle to the starting position. To accomplish this, as schematically shown in Fig. 13, there is provided a control circuit and a power transmitting circuit (represented by dark lines) connected to be energized by the three line conductors $L_1$, $L_2$ and $L_3$. Line conductors $L_1$ and $L_2$ are connected to energize the primary winding of a transformer 474, the secondary winding of which is connected to transmit current of reduced voltage to control circuit conductors 475 and 476. To start a working cycle, a start button switch 477 is momentarily depressed to simultaneously effect forward rotation of the feed driving motor 92 and forward rotation of the spindle motor 88. Upon closure of switch 477, a circuit is completed from energized conductor 475, through the normally closed contact bar of a stop switch 479 and the upper bar of switch 477 to a conductor 480. The conductor 480 is connected directly to energize the coil of a spindle motor relay 481, the circuit being completed via a conductor 482 to energized conductor 476. A holding circuit for retaining the relay 481 energized is completed via a conductor 483, closed contact bar 484, conductor 485 to a conductor 486. Energization of the relay 481 to upwardly closed position effects closure of the three lower contact bars associated therewith to transmit current from line conductors $L_1$, $L_2$ and $L_3$ to conductors 490, 491 and 492 to energize the spindle motor 88 for forward rotation.

At the same time, closure of a lower contact bar 493 associated with switch 477 completes a circuit from energized conductor 486 to a conductor 494 connected to energize the coil of a forward feed motor relay 496. The circuit for energizing forward relay 496 is completed via a conductor 497, and a normally closed interlocking contact bar 498 of a reverse motor relay 499 to energized conductor 476. A holding circuit for retaining the relay 496 in energized closed position is completed via a conductor 503, a closed contact bar 504 of the relay to a conductor 505 connected via a normally closed contact bar 506 of reverse cycle switch 95 to the energized conductor 486. Closure of the three lower contact bars of the relay 496 transmits current from line conductors $L_1$, $L_2$ and $L_3$ to conductors 509, 510, and 511 to energize the feed motor 92 for forward feeding movements.

As shown in Fig. 3, energization of the drive motor 92 in a forward direction effects a corresponding rotation of the feed screw 93 to move the feed unit 85 forwardly, thereby effecting a corresponding forward axial feeding movement of the quill 60 and tool spindle 81. The feeding movement is actually effected by engagement of the clutch element 90 with the clutch element 82 for simultaneously rotating the tool spindle 81 and effecting outward feeding movement of the quill 60 in opposition to the spring 79. The cutting stroke or extent of forward spindle feeding movement is determined by the actual placement of the stop dog 96 relative to the saddle 30.

As soon as the spindle 81 has reached the most forward point of its working stroke, the dog 96 engages the switch 95 to effect reversal of the drive unit 85 to its starting position. During reverse or retracting movement of the feed unit 85, the spindle motor 88 continues to rotate in a forward direction for effecting corresponding rotation of the tool spindle 81. To effect reversal of the drive unit, as shown in Fig. 13, the switch 95 is dog actuated in a manner that the normally closed upper contact bar 506 is moved to open position and, simultaneously therewith, a normally open lower contact bar 512 is moved to closed position. Movement of upper contact bar 506 to open position interrupts the circuit to the coil of the forward motor relay 496, permitting the contact bars to drop to open position. At the same time, the lower contact bar 512 is moved into bridging engagement between conductors 514 and 515. Thus, a circuit is completed via conductor 514, the closed contact bar 512 and a conductor 515 to energize the coil of reverse motor relay 499. From the coil of the relay 499, the return circuit continues through a conductor 516 connected through a normally closed, interlocking contact bar 518 of relay 496 to a conductor 520. A holding circuit for retaining the reverse motor relay 499 in energized closed position is completed through a conductor 521, a closed contact bar 522 to a conductor 523 connected via a normally closed contact bar 524 of dog actuated cycle stop switch 97 to energized conductor 486. Upon closure of reverse relay 499, the three lower contact bars thereof are moved into closed position to complete a circuit from conductors $L_1$, $L_2$ and $L_3$ to conductors 509, 510 and 511 for energizing the motor 92 to rotate in a reverse direction for effecting spindle retracting movement.

Upon movement of the feed driving unit to its original starting position, the dog 98, Fig. 3, engages the switch 97 moving the contact bar 524, Fig. 13, to an open position, thus interrupting the holding circuit to the reverse motor relay 499. Thereupon, the relay 499 drops to open position to deenergize the motor 92. The spindle motor 88 is connected to be continuously energized until the stop switch 479 is depressed to interrupt the circuit to the coil for the spindle motor relay 477, thereby interrupting the holding circuit and permitting the relay to drop to an open position for deenergizing the spindle motor 88.

Although the invention has been shown and described as applied to the indexable spindle carrying drum of a milling machine, it is to be understood that it may be incorporated with equal advantage in other major, indexably movable members of a machine tool. For example, the novel features of the indexing control system may be utilized to index a rotatably mounted, work supporting table for a machine tool as well as an indexable tool supporting member. Although particular structures have been shown and described in considerable detail as exemplifying the manner in which the various embodiments of the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, I hereby claim as my invention:

1. In a machine tool, a frame, a rotatable member rotatably carried by said frame and being movable to a plurality of index stations, a source of electrical energy, selectively energizable reversible power operable driving means connected to move said member, a forward controller actuatable to energize said driving means for forward rotation, a reverse controller connected to energize said driving means for reverse rotation, a coordinately presettable phase converter and phase shift network interconnected in series and connected to be energized by said source, a single control dial and interconnected switching and circuit means operatively connectable to coordinately adjust said phase converter and said phase shift network for supplying a resultant reference voltage phase output signal that corresponds in electrical degrees to the next selected index position of said member, a synchro connected to be rotated by said member and operative to supply an output signal phase corresponding in electrical degrees to the existing indexed position of said member, and an electrical comparator connected to be actuated in accordance with the difference between said reference phase signal and said positioning phase signal, said comparator being connected to energize said forward controller whenever the difference between said signals is less than 180 degrees and to energize said reverse controller whenever the difference between said signals is greater than 180 degrees, said comparator being connected to de-energize said motor controllers upon arrival of said rotatable member at a position in which concidence exists between the phase output signal from said synchro and the presettable reference phase signal.

2. In an indexable control system, a rotatable member, a cam plate provided with a plurality of peripherally spaced cam lobes connected to be rotated by said member, a motor connected to rotate said member for advancing it to a selected position corresponding to the angular spacing of a selected one of said cam lobes, a bodily movable switch normally being urged inwardly to a fixed position adjacent the periphery of said cam plate and in position to be engaged by the extending cam lobes, a presettable index control system including a source of power actuatable to energize said motor for initiating a selected index movement of said member at a rapid rate, said index control system being connected to radially retract said switch from its position adjacent the periphery of said cam upon initiation of a rapid indexing movement, a creep control actuatable to reduce the speed of said motor during final positioning, said presettable control being operatively connected upon arrival of said member at a predetermined distance from its selected position to actuate said creep control and release said switch from retracted position for bodily movement into a position to be engaged by one of the cam lobes presented by said cam and corresponding to the selected position of said member, and circuit means connected to be actuated upon continued movement of said member to move the cam lobe corresponding to the selected index position into the selected position to actuate said switch, said switch and said circuit means being operatively connected when actuated to de-energize said motor for stopping said member in selected position.

3. In combination with a rotatable machine tool member, an electrically operable index control system including a source of electrical energy and comprising a rotatable selsyn transformer responsive to rotation of said member in such a manner as to provide an angular voltage signal phase corresponding to the existing angular position of said rotatable member, a presettable electrical reference control system comprising a series connected phase converter and phase shift network including adjusting means connected to provide a selected resultant angular voltage reference phase corresponding to the next desired angular indexed position of said member, circuits connected to transmit electrical energy from said source to energize said selsyn and said presettable reference control system, a vector difference detector operatively connected to measure the difference between the existing voltage phase signal from said selsyn and the reference voltage phase signal from said presettable control system, said vector difference detector being connected to supply an output signal of a duration that varies in accordance with the angular difference between the existing phase signal and the reference phase signal, and power operable member moving means including circuit means connected to be activated by the output signal from said vector difference detector and being connected to move said member a corresponding distance from its last selected indexed position.

4. In combination with a rotatable machine tool member, an electrically controllable index system including a source of electrical energy and comprising a rotatable selsyn responsive to rotation of said member in such a manner as to provide an angular voltage signal phase corresponding to the existing angular position of said rotatable member, a presettable electrical reference control system comprising a series connected phase converter and phase shift network including adjusting means connected to provide a selected angular voltage reference phase corresponding to the next desired angular indexable position of said member, circuits connected to transmit electrical energy from said source and connected to energize said selsyn and said presettable reference control system, a vector difference detector operatively connected to measure the difference between the existing voltage phase signal from said selsyn and the reference voltage phase signal from said presettable control system, said vector difference detector being connected to supply an output signal of a duration that varies in accordance with the angular difference between the existing phase signal and the reference phase signal, and power operable member moving means connected to be activated by the output signal from said vector difference detector and being connected to move said drum a corresponding distance from its last selected indexed position.

5. In a positioning control system for the movable member of a machine tool, a selsyn operatively connected to be actuated by said member and being operative to provide a positioning voltage phase signal corresponding to the existing position of said movable member, a presettable reference phase control system selectively adjustable to provide an angular reference phase signal corresponding to the next selected indexed position of said member, a common source of electrical energy connected to energize said selsyn and said reference phase control system, and a reversible motor including a source of energy and an actuating control connectable to move said member, said actuating control being operative to activate said reversible motor for moving said member, said reversible motor being connected to stop movement of said member as soon as the position indicating phase signal from said selsyn coincides with the reference phase signal from said presettable reference control system whereby said member is movable to a predeterminately selected position.

6. In a machine tool, a frame, a quill support member rotatably journalled on said frame, a power source connected to rotate said member, a positioning control system connected to activate said power source for moving said member to a selected position and comprising a position indicating selsyn connected to be rotated by said member, said selsyn being adapted to provide an output voltage phase signal corresponding to the existing angularly adjusted position of said member, a presettable control including a series connected phase converter and phase shift network including selectively adjustable circuit connections operative to provide a reference voltage phase output signal corresponding to a new selected indexed position of said member, a source of energy connected to energize said selsyn and said presettable reference control, a vector difference detector connected to be activated in accordance with the difference between said phase signal from said selsyn and said reference phase signal from said presettable control, and a circuit connected to be completed by said detector for activating said power source for moving said member a distance varying according to the difference existing between the phase signal from said selsyn and the reference phase signal from said presettable control, said detector being operative to deactivate said circuit for de-energizing said power source as soon as coincidence exists between the phase signal from said selsyn and the reference phase signal from said presettable control.

7. In combination with a rotatably indexable support member, a cam provided with a plurality of circumferentially spaced cam lobes connected to be rotated in synchronism with said support member, a pair of switches provided with actuating plungers and being carried for bodily movement relative to the periphery of said rotatable cam, a movable support for said switches connected to retract said switches from engagement with said cam, said support being operative to move said switches radially toward the periphery of said cam in a manner that the actuating plungers therefor are in a predetermined position relative to the cam lobes presented by said cam, a power source connected to rotate said member and said cam in synchronism, a presettable control system operative to activate said power source for moving said member to a predetermined indexed position, said control system comprising a coarse positioning mechanism operative to retract said switch support and to effect activation of said power source for rapidly moving said member to a predetermined position relative to its final selected indexed position, said switch support connected to be moved inwardly upon the approach of said member to its predetermined selected index position, and shunt control circuits including a slow speed control for final positioning interconnected between said switches and said power source in a manner that said member and said cam continue to rotate until said switches are coincidently actuated by one of the cam lobes presented by said cam that corresponds to the selected indexed position of said member, said switches being coincidently actuatable to de-energize said shunt control circuit to stop rotation of said member and said cam in selected index position.

8. In an index control mechanism, a rotatable cam plate presenting a plurality of peripherally spaced cam lobes of identical configuration, a retractable switch mechanism carrying a pair of spaced apart switches provided with switch actuating means normally urged into switch actuating relationship with the cam lobes presented by the periphery of said cam plate, said switches being connected to stop rotation of said cam plate whenever both of the actuating means therefor are simultaneously actuated by the same cam lobe, means for retracting said switch mechanism from engagement with the periphery of said cam plate, an electro-hydraulic control system operatively connected to initiate rapid indexing movement of said cam plate and simultaneously connected to actuate said retracting means for moving said switch mechanism away from engagement with said cam plate, a presettable electrical measuring system operatively connected to predeterminately vary the distance said cam plate is moved and being operative to predeterminately deactivate said switch mechanism retracting means in a manner that the actuating means therefor are urged into a position to be engaged by one of the cam lobes presented by said cam plate, one of said switches being operated by engaging an appropriate portion of a cam lobe corresponding to the selected index position to establish control for continued index movement, and a shunt circuit interconnected between said cam operated switch carried by said retracting mechanism and said electro-hydraulic control system, said cam operated switch being coincidently positioned by movement of the associated cam lobe to a position actuated with said other switch carried by said retracting mechanism upon movement of the cam lobe corresponding to the selected index position of said cam plate to a position intermediate the actuating means for said switches.

9. In a machine tool provided with an indexably rotatable drum, a presettable index control system comprising power drive means actuatable to rotate said drum to predetermined position and comprising a phase converter and a series connected phase shift network adjustable to provide a resultant output voltage phase signal corresponding to the next selected indexed position of said drum, a position indicating synchro connected to be driven by said drum and operative to provide an output voltage phase signal corresponding to the existing position of said drum, a source of electrical energy connected to energize said phase converter and said synchro, and a source of electrical energy including a cycle start switch interconnected in said control system for energizing said power drive means to effect indexable movement of said drum, said power drive means being operative to stop indexing movement of said drum upon establishment of coincidence between said reference voltage phase signal and said position indicating phase signal from said synchro.

10. In an index control mechanism, a rotatable cam plate presenting a plurality of peripherally spaced cam lobes, a retractable switch mechanism carrying a pair of spaced apart switches provided with actuating means and being normally urged into switch actuating relationship with the cam lobes presented by the periphery of said cam plate, said switches being connected to stop rotation of said cam plate in a selected position whenever both of the actuating means therefor are simultaneously actuated by the same one of said cam lobes, said switch mechanism being operative to reduce the indexing speed of said cam plate from a rapid to a creep rate whenever a single one of said switches is actuated during the interval the associated actuating means is engaged by one of said cam lobes, one of said switches being separately actuated by one of said cam lobes to initiate the creep rate of movement prior to both of said switches being coincidentally actuated to stop movement of said cam plate in selected position, means for retracting said switch mechanism from engagement with the periphery of said cam plate, a control system including a source of power and a creep speed drive being operatively connected to initiate rapid indexing movement of said cam plate and simultaneously connected to actuate said retracting means for moving said switch mechanism from engagement with said cam plate, a presettable electrical measuring system operatively connected to predeterminately vary the distance said cam plate is moved and being predeterminately operative to deactivate said swtich mechanism retracting means in a manner that said switch actuating means are sequentially engaged to initially effect activation of one of said switches for activating said control system to initiate creep rate and subsequent coincident actuation of both of said switches for activating said control system to stop indexing movement of said cam plate in selected position.

References Cited in the file of this patent

UNITED STATES PATENTS

| | | |
|---|---|---|
| 2,366,398 | Harrington | Jan. 2, 1945 |
| 2,730,175 | Piperoux et al. | Jan. 10, 1956 |
| 2,820,936 | Rainey | Jan. 21, 1958 |
| 2,859,644 | Watts | Nov. 11, 1958 |